Aug. 4, 1931.  H. WILLSHAW ET AL  1,816,883
SEALING THE ENDS OF VESSELS AGAINST INTERNAL FLUID PRESSURE
Filed Feb. 18, 1930   3 Sheets-Sheet 1
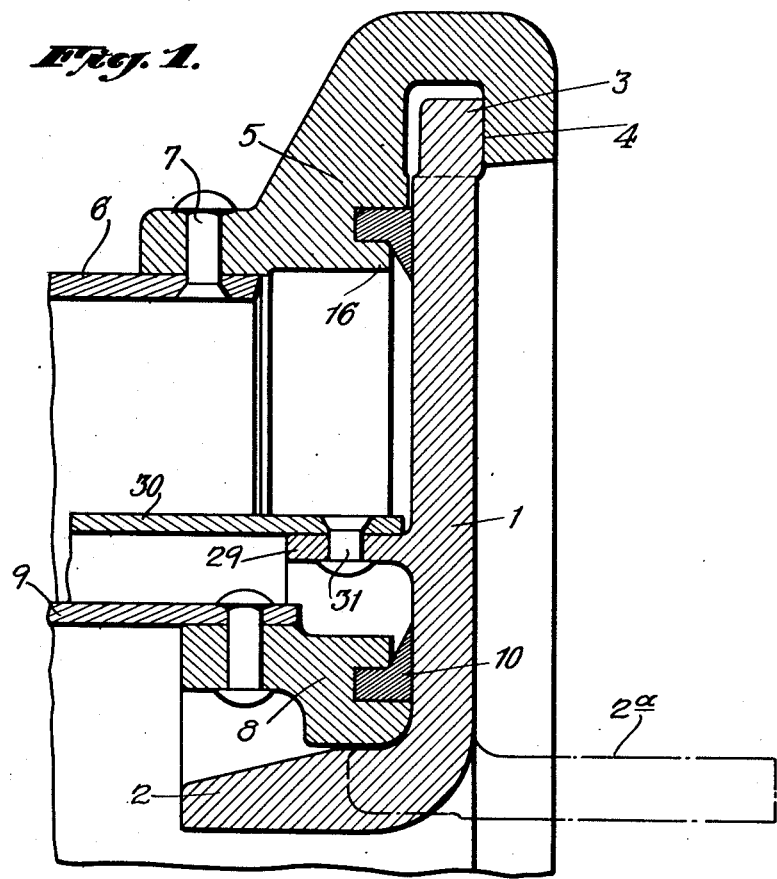
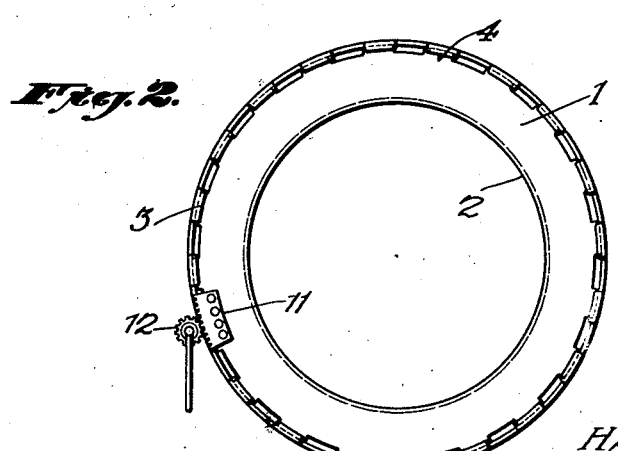
Inventors
HARRY WILLSHAW
WALTER GEORGE GORHAM
EDWIN RAMSBOTTOM.
By their Attorneys
Usina & Rauber

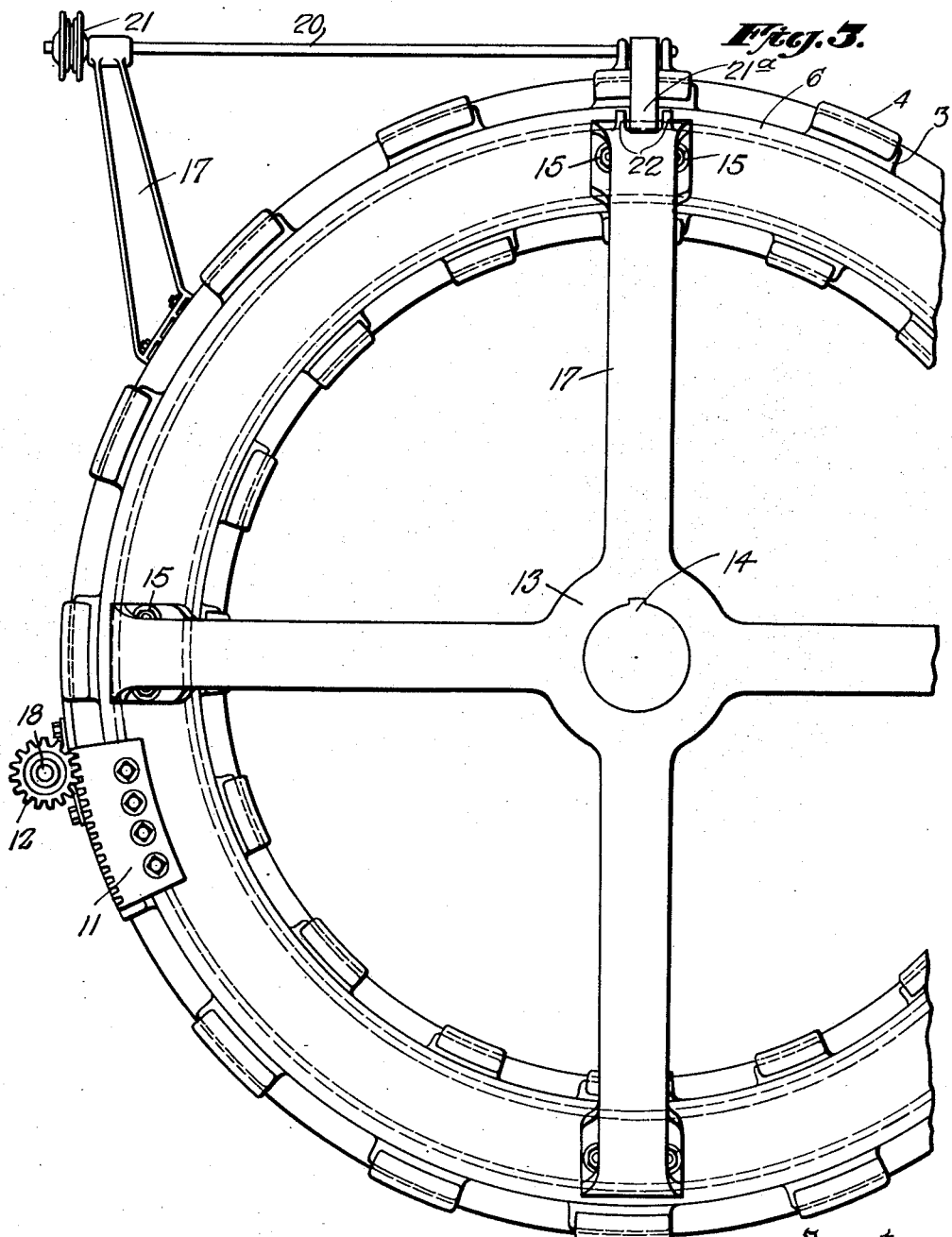

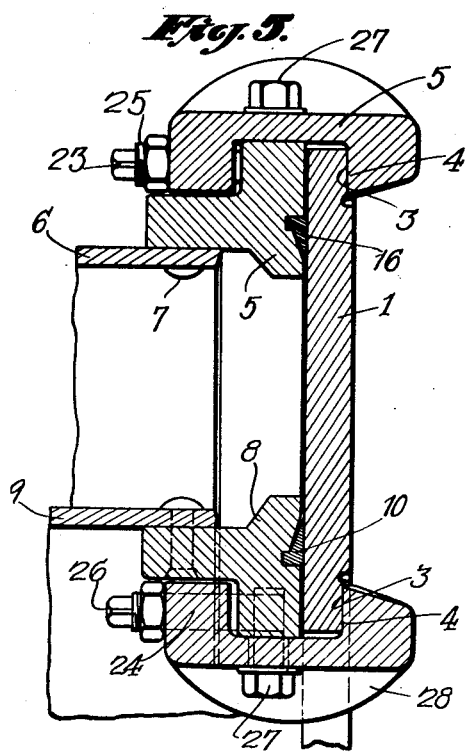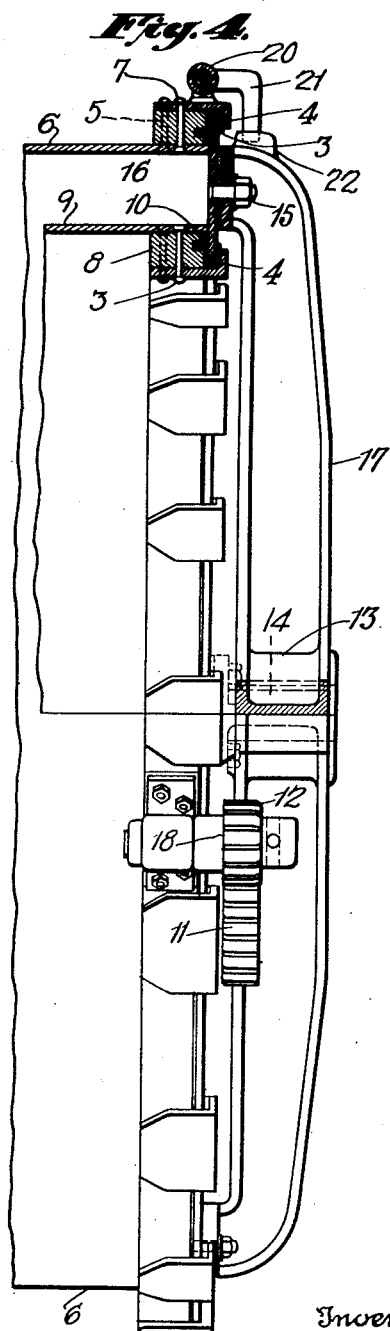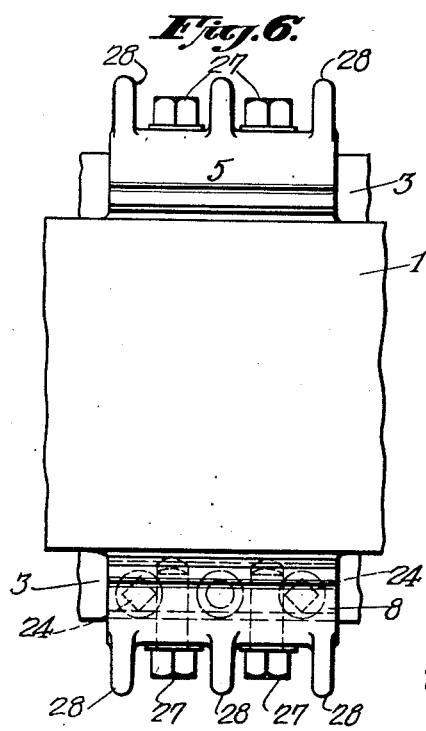

Patented Aug. 4, 1931

1,816,883

UNITED STATES PATENT OFFICE

HARRY WILLSHAW, OF WILDE GREEN, NEAR BIRMINGHAM, WALTER GEORGE GORHAM, OF ERDINGTON, AND EDWIN RAMSBOTTOM, OF HEYWOOD, ENGLAND, ASSIGNORS, BY DIRECT AND MESNE ASSIGNMENTS, OF ONE-HALF TO DUNLOP RUBBER COMPANY, LIMITED, OF ERDINGTON, BIRMINGHAM, ENGLAND, A CORPORATION OF GREAT BRITAIN, AND ONE-HALF TO J. MILLS & CO., LTD., A CORPORATION OF GREAT BRITAIN

SEALING THE ENDS OF VESSELS AGAINST INTERNAL FLUID PRESSURE

Application filed February 18, 1930, Serial No. 429,426, and in Great Britain February 19, 1929.

This invention concerns improvements in or relating to the sealing of the ends of boilers or fluid containers and is particularly suitable for those vessels having two or more concentric shells between which a fluid is to be retained without leakage.

According to this invention in vessels which contain a fluid between two concentric shells and which have two rings of resilient fluid-proof material, adapted to form a fluid tight seal, we provide a door rotatable to compress the resilient rings so as to form a fluid proof joint by the engagement of one or of two concentric rows of spaced inclined surfaces upon the door adapted to engage or disengage with corresponding parts upon the vessel when the door is rotated.

The door may be supported by arms united centrally in an apertured boss formed to allow rotation or axial movement upon a shaft, and the door may be rotated by a pinion on the vessel engaging a rack segment on the door and may have independently operable locking means preventing rotation.

In the accompanying drawings:—

Fig. 1 is a sectional view of part of the door in contact with a vessel having concentric shells;

Fig. 2 is an elevation of the door;

Fig. 3 is an elevation to a larger scale showing the supporting arms, the rotational mechanism, and locking device, and Fig. 4 is a side elevation, the lower half being an outside view and the upper a sectional view.

Figs. 5 and 6 are views showing an alternative modification.

The door consists of an apertured disc or ring 1 the inner periphery of which may be flanged at 2 or alternatively as shown by the dotted lines at 2a in Fig. 1, and which is provided with spaced bearing surfaces 3 attached to or formed upon the ring 1, each of which contact with complementary surfaces 4 formed upon the peripheral members 5 and 8 attached to the outer shell 6 by suitable means such as rivets 7.

To the inner shell 9 is attached the peripheral member 8 which houses a ring 10 of suitable material such as rubber in similar manner to the ring 16 housed in the member 5.

The ring 1 is supported by four arms 17 preferably of I section, the central boss 13 being apertured to receive a shaft to which it may be keyed by the key slot 14 when it is required to rotate the door by means of the shaft.

The arms 17 are secured to the ring 1 by studs or stud bolts 15 and the door is made to seal the vessel by rotation in clockwise direction effected by the segmental rack 11 and pinion 12 the rack 11 being secured to the ring 1. The pinion 12 may be turned by inserting a bar in the hole 18 or by power means where necessary.

In Fig. 3 the door is shown sealing the space between the shells and the flanges 3 are engaged beneath the complementary members 4. To release the fluid seal the door is rotated anticlockwise by means of the rack and pinion 11 and 12 when it may then be axially withdrawn from the vessel or adapted to be swung away on hinges if more convenient.

For further security a locking device may be provided consisting of a bracket 19 carrying a shaft 20 rotatable by a chain and pulley 21 to position a key 21a adapted to lie between shoulders 22 formed on one of the supporting arms 17, so that rotation of the door is prevented until the locking device is positively operated.

In Figs. 5 and 6 a modification is shown which consists in providing adjustable positioning means for the members 5 and 8, whereby wear on the parts may be taken up and the tightness of the seal be increased when necessary.

For this purpose we provide screw members 23 and 24 threaded externally to engage the members 5 and 8 respectively, having ends conveniently formed for rotation, and clamping nuts 25 and 26 for maintaining the correct engaging position of the members 24 and 23 with the members 5 and 8 while the studs 27 are tightened up to clamp the parts together. The members 5 and 8 may be additionally stiffened by flanges 28.

Where required for special purpose such as vulcanizing lengths of strip or sheet material, the doors 1 may be formed with one or more brackets 29 as shown in Fig. 1 adapted to support one or more members forming an approximately cylindrical surface 30, which may be detachable or may be secured to the brackets 29 by rivets 31 or other suitable means.

Various modifications may be made by those skilled in the art without departure from the invention as defined in the appended claims.

We claim:

1. A door for sealing vessels which contain a fluid between two concentric shells and which have two rings of resilient fluid-proof material adapted to form a fluid tight seal, in which the door is rotatable to compress the resilient rings so as to form a fluid-proof joint by the engagement of one or of two concentric rows of spaced inclined surfaces upon the door adapted to engage or disengage with corresponding parts upon the vessel when the door is rotated.

2. A door according to claim 1 comprising a ring having spaced inclined faces adapted to contact with similar complementary faces upon the vessel and provided with arms uniting in a centrally apertured boss formed to allow rotation or axial movement upon a shaft.

3. A door according to claim 1 having a segmental rack adapted to be engaged by a pinion upon the vessel for securing or releasing the door to the vessel.

4. A door according to claim 1 having independent locking means preventing the rotation of the door.

5. A door according to claim 1 in which the ring contacting the fluid sealing parts is inwardly or outwardly flanged on its inner periphery.

6. A door according to claim 1 in which the ring is provided with one or more members carried thereon so as to be inserted or withdrawn from the concentric shells of the vessel.

In witness whereof, we have hereunto signed our names.

HARRY WILLSHAW.
WALTER GEORGE GORHAM.
EDWIN RAMSBOTTOM.